Sept. 24, 1968  E. J. JOHNSTON ETAL  3,402,533
HAY HARVESTING AND CONDITIONING DEVICE
Original Filed March 15, 1965  4 Sheets-Sheet 1
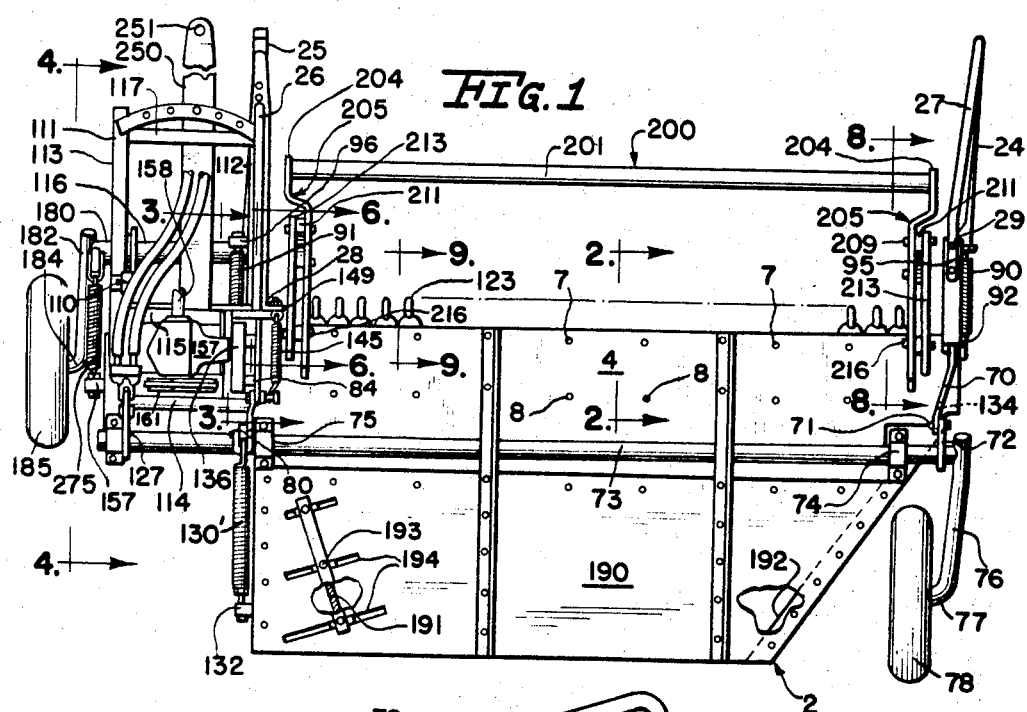
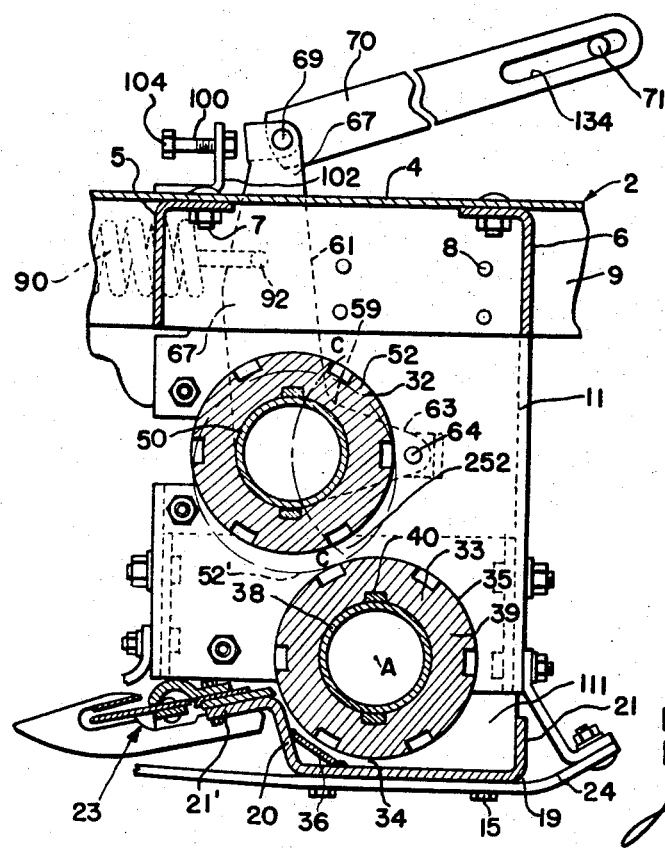
INVENTORS
Edward J. Johnston
Peter J. Peacock
*John J. Kowalik*
Attorney

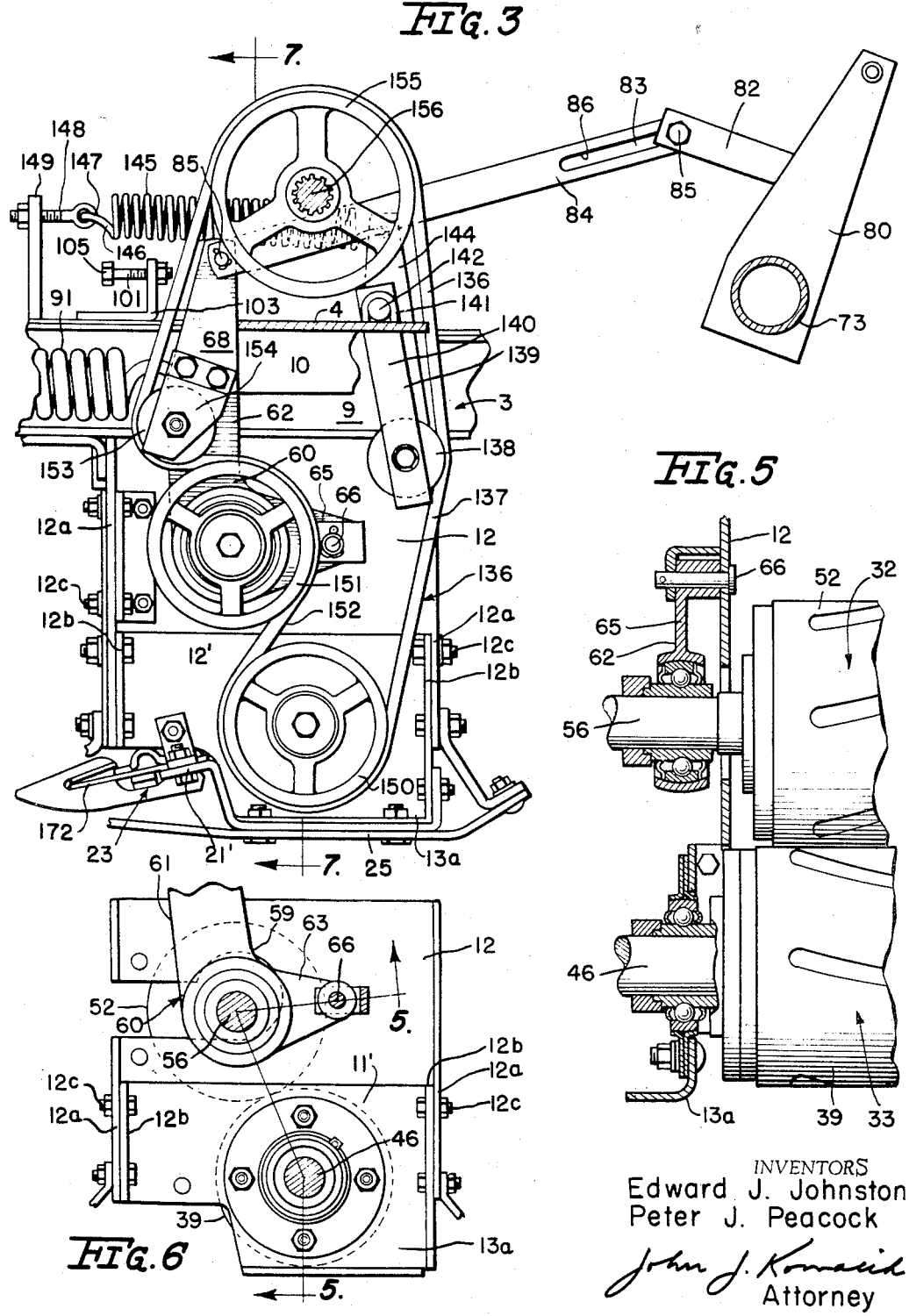

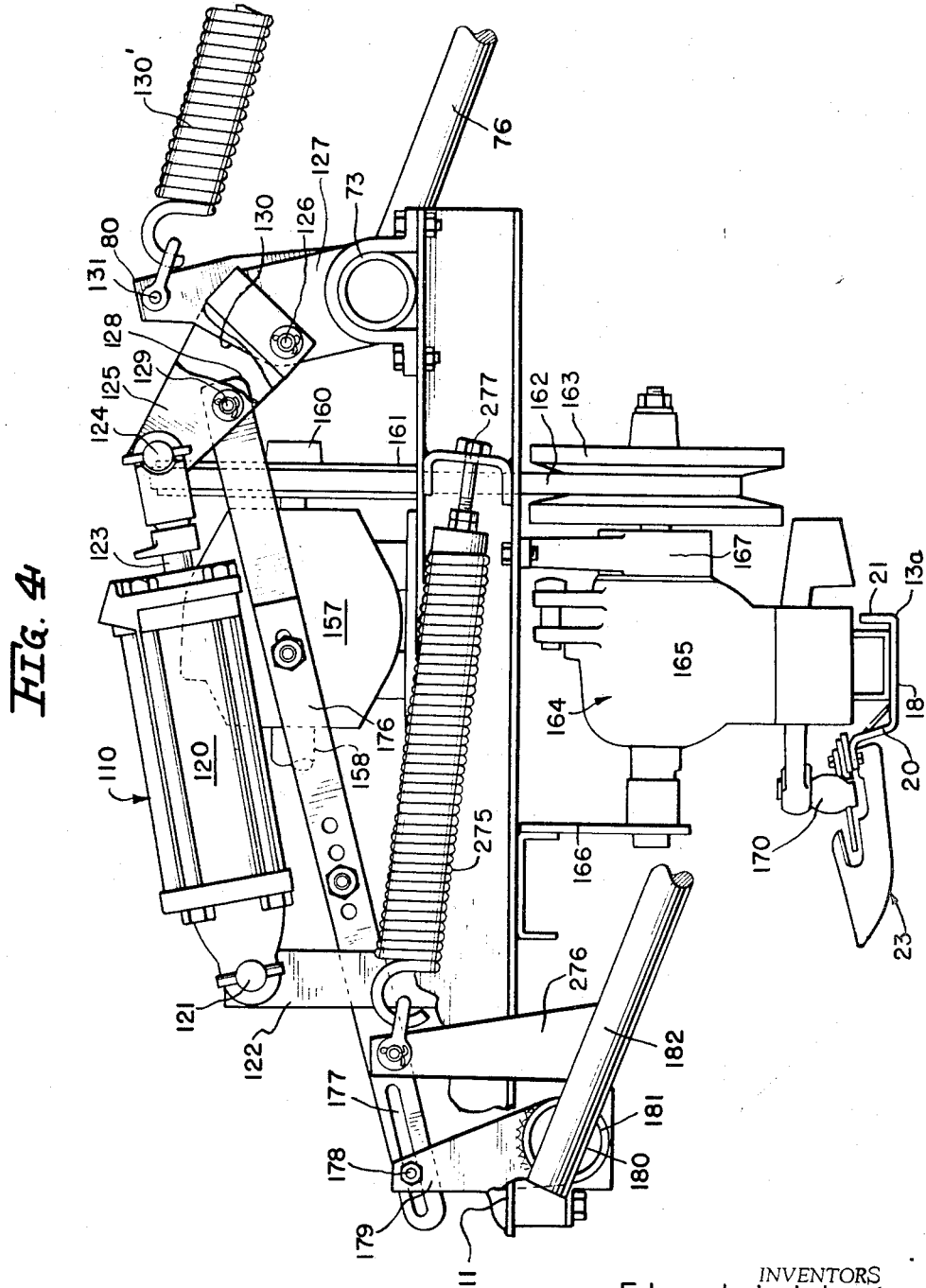

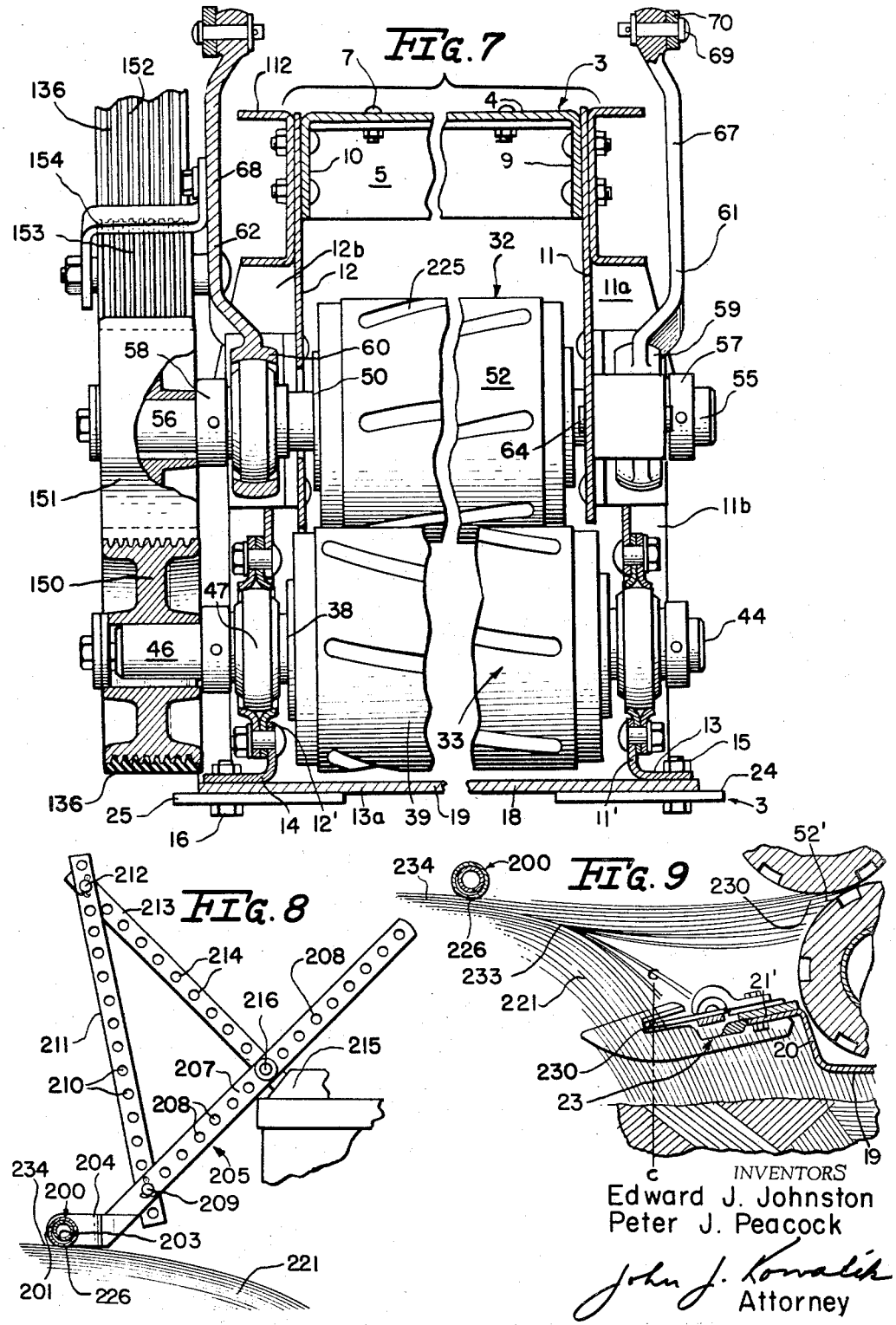

United States Patent Office 3,402,533
Patented Sept. 24, 1968

3,402,533
HAY HARVESTING AND CONDITIONING DEVICE
Edward J. Johnston, La Grange Park, and Peter J. Peacock, Western Springs, Ill., assignors to International Harvester Company, Chicago, Ill., a corporation of Delaware
Original application Mar. 15, 1965, Ser. No. 439,588. Divided and this application June 9, 1967, Ser. No. 644,895
1 Claim. (Cl. 56—23)

ABSTRACT OF THE DISCLOSURE

A hay conditioner having side members and upper and lower rollers therebetween, a channel bottom member interconnecting the side members and cupping the lower roller therein and having a forwardly directed mower supporting flange.

---

This invention is directed to forage harvesting machines and more specifically to a machine having mowing and crop processing components and is particularly exemplified in a mower-crusher combination though not specifically restricted thereto. This application is a division of U.S. application Ser. No. 439,588, filed Mar. 15, 1965 for Method of Harvesting Crops and Apparatus Therefor.

In harvesting machines particularly of the type used for cutting and processing hay it heretofore has been a practice to normally first cut the hay by a conventional mower and then to pick up the swath by a crusher which processes the hay to make it more palletable and to cause it to dry at a more uniform rate. Such an operation usually entails the use of several tractors and frequently a labor force of at least two operators. If a single mowing and crushing unit is utilized with a single tractor, the cutting and the crushing is either performed on adjacent swathes or the material is redeposited on the ground and then picked up again by the crusher. In the adjacent swath operation care must be taken to limit the extent of cutting so that the crushing occurs during a time when the plant is still succulent otherwise, if it becomes too wilted, it will not crush. Furthermore, this type of equipment involves extensive drive linkage and hitch mechanisms and is, at best, a makeshift operation.

The optimum arrangement, of course, is to cut the material and thereafter immediately pass the material through the hay conditioning mechanism without redepositing the material on the ground so that minimum loss entails. In such combinations a more compact unit is obtained which minimizes the cost over the separate units. Machines of the combination cutting and crushing type heretofore available have incorporated for successful operation a large reel which functions to sweep the material off the cutter bar and deliver the material into the crushing rolls. The large reel results in a large, bulky machine and the cantilevered suspended weight of the reel requires excessive supports. The large mass and weight of the machine in being pulled by the tractor in laterally offset relation develops heavy side drafts.

A general object of the invention is to provide a novel combination harvesting machine which obviates the use of the gathering reel.

A further object of the invention is to provide a novel harvesting machine which comprises an elongated mowing device extending transversely to the direction of movement of the harvester and hay conditioning rollers disposed behind the mowing device in receiving relation to the crop cut by the mower, the delivery of the cut crops being effected by a rolling prostrating mechanism so arranged and related to cutting mechanism and the hay conditioning rolls as to hold the material being cut off the cutter bar upon the crop material thereahead so that the butt ends of the cut crops flick into the intake nip of the conditioning rollers whereby the cut crop is readily grasped by the hay conditioning rollers. Thus any intermediary conveying structure is eliminated and the crops are readily processed.

The invention also envisions an implement provided with a rotatable prostrating bar ahead of the mower, the prostrating bar being adjustable for optimum position with respect to the mower and the material which is to be cut so as to obtain efficient presentation of the cut material to the conditioning mechanism and operate in various conditions and crops.

The invention comprehends an agricultural implement having a mower transverse to the direction of traverse, a pair of rollers behind the mower and a prostrating bar in front of the mower so related as to bend the plants and hold them bent until they are being cut whereby the cut plants fulcrum on the succeeding plants to be cut and flick upwardly into the rollers which are spaced a flicking distance from the mower, flicking distance being defined as the distance which the succulent plants which are being cut will spring back to or beyond their straight position or lengths, it being understood that the instant invention envisions the cut crops riding piggy-back upon the uncut crops immediately ahead of the line of cutting.

These and other objects and advantages inherent in and encompassed by the invention will become more readily apparent from the specification and drawings, wherein:

FIGURE 1 is a plan view of a mower crusher combination machine incorporating the invention;

FIGURE 2 is an enlarged cross-sectional view taken substantially on line 2—2 of FIGURE 1;

FIGURE 3 is an enlarged vertical transverse sectional view taken substantially on the line 3—3 of FIGURE 1;

FIGURE 4 is an enlarged fragmentary left side elevational view of the unit taken on line 4—4 of FIGURE 1;

FIGURE 5 is a sectional view taken substantially in the planes indicated by line 5—5 of FIGURE 6;

FIGURE 6 is a sectional view taken substantially on the line 6—6 of FIGURE 1;

FIGURE 7 is a sectional view taken substantially on line 7—7 of FIGURE 3, the rollers being shown in full lines;

FIGURE 8 is an enlarged sectional view taken substantially on line 8—8 of FIGURE 1; and FIGURE 9 is an enlarged sectional view taken substantially on line 9—9 of FIGURE 1.

Description of the invention

Describing the invention in detail and having particular reference to the drawings there is shown a harvesting machine generally designated 2 which in the exemplified embodiment is a combined mower and crusher.

The harvester generally designated 2 comprises a framework 3 which includes a top plate member 4 and transverse front and rear beams 5 and 6 which are interconnected at their upper ends with the plate member 4 as by bolts 7 and 8 and at their ends are interconnected with side sheets or plates 11, 12. Plate 4 comprises dependent flanges 9 and 10 which are interconnected with the upper ends of the laterally spaced upright supports 11 and 12 which comprise substantially vertical fore and aft extending plates which at their front and rear edges are provided with flanges 11a, 12a respectively which extend normal to the planes of the plates 11 and 12 and at their lower ends overlap similarly formed mating flanges 11b, 12b on the plates 11′, 12′ of a lower attachment portion 13a.

Flanges 11a, 11b are interconnected by bolts 11c, and flanges 12a, 12b are interconnected by bolts 12c as best seen in FIGURE 6.

The upright plates 11′, 12′ which flank panels 11, 12 and at their lower edges have substantially horizontal flange structures 13 and 14 are suitably connected as by bolting at 15 and 16 to an intermediate web 18 of a bottom channel beam member 19. The channel beam member 19 comprises, in addition to the substantially horizontal bottom web 18, front and rear upwardly extending shielding flanges 20 and 21. The shielding flange 20 extends diagonally upwardly and forwardly and merges into the rear end of a downwardly and forwardly inclined mower mounting flange 21′ which serves as a support and mounting for a mower of the reciprocating type generally designated 23. The lower web 18 of the horizontal beam member 19 is also connected by means of the bolts 15 and 16 to runners 24 and 25 which project upwardly and forwardly and at their forward ends are connected to diagonally upwardly and rearwardly extending upper divider portions 26 and 27 which are respectively connected as at 28 and 29 to portions of the upper deck structure 4.

The side supports 11 and 12 carry an upper hay conditioning roller 32, and the attachment portion 13a carries a lower roller 33 on the plates 11′, 12′. The lower roller 33 as well as the upper roller 32 extend generally parallel to the mower 23. The lower roller 33 extends into a pocket 34 developed by the channel member 19 whereby the lower portion of the roller is brought close to the ground and is shielded from injury as well as entanglement with material by the flange portion 20 of the beam member 19. It will be seen that the plane of the sickle is almost diametrically arranged with respect to the axis of rotation designated A of the lower roller and that the periphery 35 of the lower roller sweeps immediately behind the mower. The juncture between the web 18 and the flange 20 of the beam member 19 is reinforced by a generally flat bar member 36 which extends in a plane substantially tangential with respect to the periphery 35 of the lower roller. This bar 36 also prevents accumulation of material between the lower roller and the channel 19 by presenting a small space with the lower roller in which any slight material accumulations are scuffed off by the roller 33. The lower roller 33 may be of any conventional structure such as well known to those skilled in the art and here for purposes of illustration is shown as comprising a center shaft 38 on which there is mounted a body of elastomer material 39 and interlocked for rotation with the shaft 38 by means of keys 40 which are suitably weld-connected or otherwise secured to the hollow shaft 38. The ends of the shaft 38 are provided with spindles 44, 46 which are journalled in bearings 47 and 48, carried or connected and mounted on lower plates 11′, 12′ of the attachment 13a. It will be noted that the instant construction allows the assembly of the lower roller with the cutter bar and then bolting the entire subassembly to the components of the hay conditioner. Also the subassembly 13a may be easily removed for servicing.

The upper roller 32 is similar to the lower roller and has a center shaft 50 and a roller body 52 which is shown to be of elastomer material which may, if desired, be impregnated with fibers. However, any combination of upper and lower rollers may be used. In other words, the bodies 39, 52 may be both of metal or they may be one of metal and the other of elastomer and their configurations would be such as well known to those skilled in the art, that is, one roller may be ribbed and the other may be smooth and vice versa or both may be smooth.

From a consideration of FIGURE 2, it will be noted that the upper roller is disposed in advance of the lower roller and overhangs the mower 23 and that in operating position as shown in dotted lines in FIGURE 2, a downwardly and forwardly open crop-receiving nip or bite 52′ is developed. The upper roller at opposite ends of the shaft 50 is provided with suitable spindles or stub shafts 55, 56 which are mounted in bearings 57, 58 located at the elbows 59 and 60 of the mounting levers 61 and 62. Lever 61 has a rearwardly extending leg portion 63 which is pivoted as at 64 by means of a suitable pin to the side wall 11, and the lever 62 has a horizontally rearwardly extending leg portion 65 paralleling leg portion 63 and pivoted as by pin 66 to the side wall 12. Thus the levers 61 and 62 swing about the coaxial pins, 64, 66 in an arc as shown on the line C in FIGURE 2 between cooperating positions and disengaged or open positions. The levers 61, 62 have upstanding leg portions 67, 68 and the leg 67 is pivoted at its upper end as by pin 69 to the forward end of a link 70 which has a lost motion pivotal connection at its rear end as at 71 to an upstanding arm 72 on the combination wheel connecting torsion member or rockshaft 73 which is journalled as by bearing 74 and 75 across the top of the top deck 4 adjacent to the rear end thereof.

The rightward end of the rockshaft 73, as best seen in FIGURE 1, is connected to a rearwardly extending arm or wheel mount 76 which has an inwardly extending spindle 77 rotatably mounting a wheel 78 which is disposed behind the rightward or grassward end of the hay conditioner. The leftward end of the member 73, as seen in FIGURE 1, is provided with an upstanding arm 80 which connects to a forwardly extending extension 82 which has a pivotal lost motion connection as at 83 with the rear end of a forwardly projecting link 84. The lost motion connection as at 83 is effected by means of a bolt 85 which operates within an elongated slot 86 in the rear end of a strap 84, the forward end of which is pivotally connected as at 85 to the upper end of the leg 62 of the lever 60.

The levers 60 and 61 are biased in a counterclockwise direction as seen in FIGURE 2 by means of a pair of tension springs 90 and 91. Spring 90 is hooked as at 92 to the leg 67 of the lever 61 and the spring 91 is hooked to the leg 68 of the lever 62. The forward ends of the springs 90 and 91 are anchored as at 95 and 96 to suitable anchors on the frame members 11 and 12.

It will be noted that the operative linkage for actuating the upper roller to operating and released positions is thus interconnected with the operating mechanism for lifting and lowering the entire unit such that as the unit is elevated to transport position, the rollers, or the upper roller will swing upwardly and when the unit is lowered, the upper roller will then swing downwardly into cooperating position. The cooperating or operational position, means a position wherein a crushing action of the upper roller against the lower roller is obtained and thus does not actually necessitate physical engagement inasmuch as the rollers may be maintained at least partially separated by means of the stops 100 and 101 which are supported by the frame structure 4, 7 and which includes brackets 102 and 103 which mount adjustable screws 104, 105 which are disposed in the path of movement of the levers 60 and 61. Screws 104, 105 may be threaded or unthreaded to vary the position of the stop to limit movement of the respective abutting levers and thus the upper roller.

The mechanism for operating the wheel structures and for engaging and disengaging the hay conditioning rolls comprises a ram 110 which is disposed over the draft framework 111 which comprises a pair of fore and aft extending inboard and outboard members 112, 113 and transverse interconnecting members 114, 115, 116 and 117, the member 112 being suitably connected by bolts of welding to the panel or plate structure 12. The cylinder 120 of the ram 110 is pivotally mounted as at 121 to an upstanding anchor 122 which is suitably secured to the beams 116 and 111. The piston 123 for the ram 110 is pivotally connected at 124 to an arm 125 which is pivoted as at 126 to the arm 127 which is secured to the axle member 73. It will be realized that the lever 125 is of U-shaped cross section and embraces the member 127 so that when the ram 120 is expanded and the piston 123 moves rightwardly as shown in FIGURE 4, the stop portion 128 as defined by the strap member pivoted on pin 129 engages the forward edge 130 of the lever 127 whereby it causes the lever 127 to rotate in a clockwise direction with the assistance of the counterbalancing spring 130' which is connected between lever 80 as at 131 and an anchor 132 on the frame portion of the hay conditioner rearwardly of a rockshaft 73 whereby the rockshaft 73 is rotated in a clockwise direction swinging the rightward and leftward wheels downwardly as hereafter explained elevating the conditioner. Simultaneously, the links 84, 70 are moved, after expending the lost motion at 86 and similar lost motion at 134, rightwardly as seen in FIGURES 2 and 4 whereupon the levers 61 and 62 are rotated about the pivots 64, 66 in a counterclockwise direction disengaging the upper roller 32 from the lower roller 33 as shown in phantom lines in FIGURE 2. Simultaneously with the disengagement of the roller 32 from the roller 33 the drive to the rollers is declutched by the loosening of the belt 136 which is trained on its backrun 137 over a tightener pulley 138 which is carried from the lower arm 139 of the lever 140 which pivots on a stub shaft 142 by being suitably journalled by U-bolts 141 from the top plate 4 of the frame structure, the lever 140 having an upper arm 144 which is connected to the rear end of a tension spring 145, the forward end 146 of the tension spring being connected as at 147 to an adjusting bolt 148 which is secured to an anchor 149 carried on the frame structure 4. The rear run 137 proceeds downwardly and wraps behind and under a pulley 150 which is connected to the mounting shaft 46 of the lower roller. The belt 136 proceeds around the forward side of the pulley 150 and then has its front run 152 wrapped around the back side of a pulley 151 which is connected to the shaft 56 of the upper roller 32. The forward run 152 of the belt proceeds under an idler and tightening pulley or clutching pulley 153 which is rotatably mounted from a bracket structure 154 which is carried by the upper leg 68 of the lever 62. Thus it will be appreciated that as the lever 62 is rotated in a clockwise direction, it will declutch pulley 153 and loosen the belt and therefore the drive to the rollers will be terminated. The belt 136 proceeds upwardly from the idler pulley or clutching pulley 153 and wraps over the top of an input pulley 155 and returns to the rear run.

Pulley 155 is keyed to an output shaft 156 of a gear box 157 which has an input shaft 158 leading thereinto said input shaft 158 being suitably connected to a suitable power source such as the power takeoff shaft of a tractor. The rear end of the gear box 157 is provided with an output shaft 160 which mounts a pulley 161 which in turn drives a belt 162 said belt 162 driving fly wheel pulley 163 of a drive transmitting and motion converting mechanism 164 which is substantially identical with that shown in U.S. Patent 2,824,416. The transmission 164 includes a housing 165 which is suitably mounted from the draft frame structure 111 as by brackets 166, 167 and the transmission has an oscillating output arm 170 which is pivotally connected to the knife head 171 of the sickle 172 of the mower structure 23.

The elevation and lowering of the hay conditioner at the leftward side is accomplished through the medium of a strap 176 which comprises several portions which are adjustable for varying the length of said strap 176 which has a lost motion connection by means of a slot and bolt construction 177, 178 (FIGURE 4) with the upper end of a lever 179 which is connected to a shaft 180 suitably journalled as by bearing structures 181 from the draft framework 111, the shaft structure 180 being connected to an arm 182 which extends rearwardly downwardly and is provided at its rear end with a generally horizontal spindle 184 which rotatably mounts the leftward wheel 185. It is to be understood that the designation leftward and rightward is when viewing the structure as shown in FIGURE 1 looking from the rear of the machine and in fact is unimportant except to orient the parts.

The upper deck structure 4 has a rearward extension 190 and downwardly extending rearwardly converging deflector sheets 191, 192 at least one of which is laterally adjustable in having bolt and nut connections as at 193 to the top portion 190 through slots 194 which extend diagonally laterally in an obtuse angular relationship to the line of draft of the machine.

One of the features of the present invention is in the provision of a novel prostrating bar assembly generally designated 200. The prostrating bar assembly comprises a transverse roller or bar structure 201 which includes a cylindrical tubular member 202 extending transversely to the direction of movement of the machine and journalled on support or shaft 203. Shaft 203 is connected at each end to the forward ends of horizontally extending portions 204 of laterally spaced arms 205. Each arm 205 in addition to the portion 204 has a diagonal upwardly and rearwardly extending portion 207 which is provided with a plurality of apertures 208, 208 along the length thereof. The apertures 208 of the portion 207 selectively receive a pin 209 therethrough which also extends through any of a selected plurality of apertures 210 in a brace or strut 211 which extend upwardly and forwardly from the point of connection at 209. The upper end of the member 211 or at points therebelow is connected by pin 212 (which extends through any of a selected aperture 210) to an upwardly and forwardly extending support arm to 213 in any of a series of spaced apertures to 214. It will be realized that each arm 213 extends diagonally upwardly and forwardly and at the lower rear end is fixedly connected by a brace or bracket 215 to top wall 4 adjacent to which each arm is connected by a pin 216 to the associated arm 207. Thus it will be realized that various positions of adjustment of the rolling prostrating bar, which in the preferred although not exclusive construction is about an inch and a half to two inches in diameter, are feasible and these positions are determined by the nature and the length of the growing crop in the field. As seen in FIGURE 9 of the drawings the prostrating bar is so arranged that it is spaced a distance from the mower bar greater than the length of the growing crops and the prostrating bar has rolling contact with the material whereas to minimize the plowing effect of the prostrating bar. It will be understood however that a stationary prostrating bar can be used but it is not as effective as a rolling type. The position of the hay conditioning rollers is such that the bottom roller has its lower portion below the plane of the sickle or mower and the upper roller of the hay conditioner projects over the mower bar so as to present an intake nip such that it is directed downwardly and forwardly and the upper roller of the hay conditioner, which in the present instance comprises a laminated tire carcass construction as shown in U.S. Patents 2,921,426 and 3,008,219 with aggressive grooves 225, tends to sweep material thereunder and to facilitate entry into the intake nip 52'. The crux of the present invention is in arranging the hay conditioning rollers as close as possible or at a minimal distance to the mower and locating the prostrating bar in front of the mower at such distance that the crops or plants 221 are engaged intermediate their ends at 226 and bent over so that as each line of cutting of the crops c—c as seen in FIGURE 1, the butt ends 230 of the plants 221 (FIGURE 9) will spring or flick upwardly away from the cutter to prevent recutting by cutter or clogging accumulations. The cut crops rest upon the arched or fulcrum portions 233 of the standing plants immediately ahead of the line of cutting. In other words, while the upper ends or portions 234 of the plants are held downwardly, the plants being succulent and springy are caused to fulcrum intermediate their ends as at 233 bringing the butt ends 230 upwardly into the intake nip 52' which is spaced a flicking distance of the plants from the cutting line c—c.

Applicants have actually tested the instant unit and have found that position of the bar relates to the nature of the crop but it must be located in an area where it will engage the crop or the plant intermediate its ends while the lower portion of the crop or plant stock is being cut below its point of fulcrum against the bent over standing crop so that by utilizing the inherent resiliency of the material the plant will snap at its butt end upwardly and thus as the machine is moving forwardly, inasmuch as it is being towed by the tongue 250 attached to the draft frame and to the tractor as at 251 is well known to those skilled in the art, the material will be quickly grasped by the hay conditioning rolls or grasping means and will be pulled through and will be discharged on the discharge side 252 in upwardly and rearwardly directed stream which will impinge against the underside of the deflector extension 190 and between the members 191 and 192 and converged into a windrow.

The instant structure thus eliminates the necessity for an extremely large complicated and costly reel which is necessitated by current constructions and has been found to operate equally well in various different crop conditions even when the material is matted and tangled so long as the mower bar can sweep under the material and cut the same.

Having described the preferred embodiment of the invention it will be realized that various other forms of the invention will become readily apparent to those skilled in the art within the spirit of the instant invention as covered by the appended claim.

What is claimed is:

1. In a hay conditioning device, a pair of laterally spaced upright supports, upper and lower cooperative rollers extending between and supported from the supports, a combined shielding and connecting structure underposed with respect to said lower roller and having a bottom wall portion and an upwardly directed shielding flange portion in front of said lower roller for shielding the same from obstructions during traverse of the device over a field, a mower mounting flange projecting forwardly from said shielding flange, and a mower mounted on said mower mounting flange, said mower and mower mounting flange sloping downwardly and forwardly in a plane intersecting the lower roller, and said upright supports comprising a plurality of complementary portions and including upper and lower removably interconnected portions and said lower roller mounted on said lower portions.

References Cited

UNITED STATES PATENTS 3,139,717 7/1964 Fischer _____ 56—1
3,197,947 8/1965 Cunningham _____ 56—1

ANTONIO F. GUIDA, *Primary Examiner.*